United States Patent
Ryu et al.

(10) Patent No.: US 9,612,141 B2
(45) Date of Patent: Apr. 4, 2017

(54) ULTRASONIC FLOW MEASUREMENT SYSTEM

(71) Applicants: WOOJIN INC., Hwaseong-si (KR); SONIC CORPORATION, Tokyo (JP)

(72) Inventors: Kye Hyeon Ryu, Suwon-si (KR); Hee June Park, Suwon-si (KR); Hyun Myoung Shin, Seongnam-si (KR); Toru Akiyama, Tokyo (JP); Kunihiro Takahashi, Tokyo (JP); Noriaki Saito, Tokyo (JP); Kazuo Takemura, Tokyo (JP)

(73) Assignees: Woojin Inc., Hwaseong-Si (KR); Sonic Corporation, Tokyo (JP)

( * ) Notice: Subject to any disclaimer, the term of this patent is extended or adjusted under 35 U.S.C. 154(b) by 0 days.

(21) Appl. No.: 14/398,270

(22) PCT Filed: Apr. 14, 2014

(86) PCT No.: PCT/KR2014/003206
§ 371 (c)(1),
(2) Date: Oct. 31, 2014

(87) PCT Pub. No.: WO2014/175588
PCT Pub. Date: Oct. 30, 2014

(65) Prior Publication Data
US 2016/0033312 A1 Feb. 4, 2016

(30) Foreign Application Priority Data
Apr. 25, 2013 (JP) .................... 2013-092106

(51) Int. Cl.
*G01F 1/66* (2006.01)
*G01F 15/18* (2006.01)

(52) U.S. Cl.
CPC .............. *G01F 1/66* (2013.01); *G01F 1/662* (2013.01); *G01F 1/667* (2013.01); *G01F 15/18* (2013.01)

(58) Field of Classification Search
CPC ...................................................... G01F 1/667
See application file for complete search history.

(56) References Cited

U.S. PATENT DOCUMENTS 4,102,186 A 7/1978 Brown
5,440,936 A 8/1995 Spani et al.
(Continued)

FOREIGN PATENT DOCUMENTS

JP 07150300 A * 6/1995
JP 2004212180 A * 7/2004
WO 2009074162 A1 6/2009

OTHER PUBLICATIONS

English Translation of International Search Report from PCT/KR2014/003206; dated Jul. 18, 2014.

*Primary Examiner* — Daniel J Colilla
(74) *Attorney, Agent, or Firm* — Baker Hostetler LLP

(57) ABSTRACT

The present invention relates to flow measurement, and more particularly, to a system for measuring a flow rate by three-dimensionally crossing a plurality of sidings each other within a conduit. An ultrasonic flow measurement system according to the present invention determines a flow central part of fluid by three-dimensionally crossing the plurality of sidings each other within the conduit in three dimensions and calculates a flow rate flowing in the conduit, meeting the flow central part, thereby more accurately measuring the flow rate than the existing method.

4 Claims, 4 Drawing Sheets

(56) References Cited

U.S. PATENT DOCUMENTS

| | | | |
|---|---|---|---|
| 6,098,466 A | 8/2000 | Shkarlet | |
| 6,277,084 B1 | 8/2001 | Abele et al. | |
| 8,336,394 B2 * | 12/2012 | Laurent | G01F 1/663 |
| | | | 73/861.29 |
| 2010/0257942 A1 * | 10/2010 | Straub, Jr. | G06F 1/662 |
| | | | 73/861.28 |
| 2012/0144930 A1 * | 6/2012 | Aughton | E02B 7/26 |
| | | | 73/861.28 |
| 2015/0268077 A1 * | 9/2015 | Mezheritsky | B01B 1/00 |
| | | | 73/861.28 |

* cited by examiner (a)　　　　　(b)　　　　　(c)

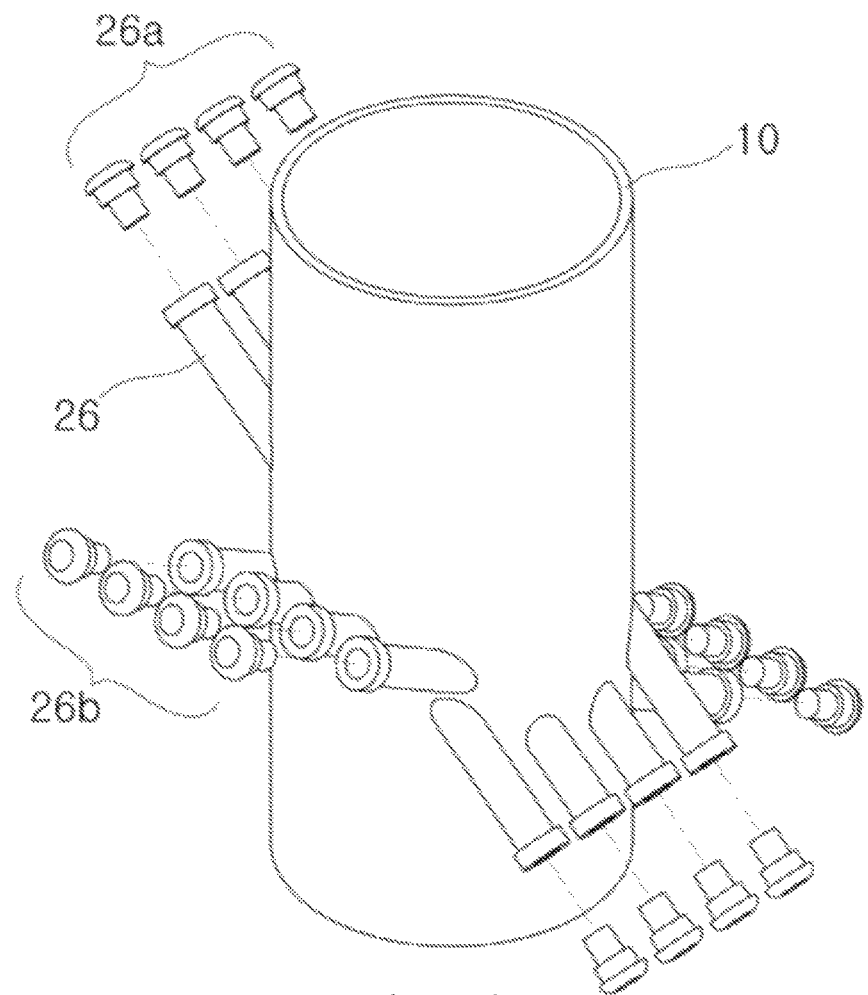
Figure 4
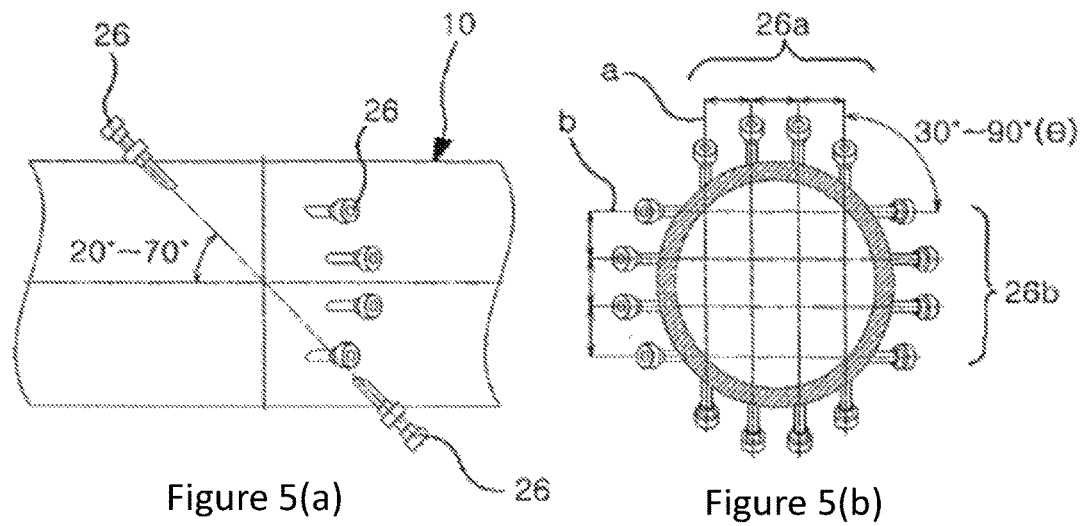
Figure 5(a)   Figure 5(b)
Figure 5

(a) Fe-Mn BASED DAMPING ALLOY (b) GENERAL STEEL

ULTRASONIC FLOW MEASUREMENT SYSTEM

CROSS-REFERENCE TO RELATED APPLICATIONS

This application is a National Stage of International Patent Application No. PCT/KR2014/003206, filed Apr. 14, 2014 and claims priority to foreign application JP 2013-092106, filed Apr. 25, 2013, the contents of which are incorporated herein by reference in their entirety.

TECHNICAL FIELD

The present invention relates to flow measurement, and more particularly, to a system for measuring a flow rate by crossing sidings each other within a conduit.

BACKGROUND ART

Generally, industrial sites which are essential to manage a flow rate of fluid measure the flow rate within a conduit using a flowmeter. Various types of technologies of measuring an amount of fluid flowing in the conduit have been published. A representative example thereof may include a volumetric flowmeter, an electromagnetic flowmeter, a mass flowmeter, a turbine flowmeter, a differential pressure flowmeter, and the like. Recently, an ultrasonic flowmeter which measures an ultrasonic moving time to obtain a linear average flow velocity and calculate a flow rate has been interested as a technology of supplementing disadvantages of the existing flowmeters. According to a flow measurement principle using the ultrasonic flowmeter, a flow rate may be basically obtained based on an average velocity of fluid and a vertical cross sectional area of the conduit filled with the fluid. This will be additionally described below.

FIG. 1 illustrates a diagram for describing the basic flow measurement principle of the ultrasonic flowmeter, FIG. 2 illustrates a flowing form of fluid within the conduit, and FIG. 3 illustrates the number of sidings corresponding to the number of ultrasonic paths within the conduit and illustrates that respective sidings do not cross each other.

First, as illustrated in FIG. 1, when a conduit having a diameter D is provided with a pair of ultrasonic sensors 1 and 2 by an angle θ, an ultrasonic moving time t between the ultrasonic sensor 1 and the ultrasonic sensor 2 may be defined by the following Mathematical Equation 1 when there is no flow of fluid.

$$t = \frac{d}{C} \quad \text{Mathematical Equation 1}$$

In the above Mathematical Equation 1, t represents the ultrasonic moving time, d represents a distance between the ultrasonic sensors 1 and 2, and C represents the ultrasonic moving velocity m/s.

When a fluid flows within the conduit at velocity v, the ultrasonic moving time may be obtained as follows.

First, when an ultrasonic moving direction and the flow direction of fluid are the same, for example, when the ultrasonic wave is transmitted from the ultrasonic sensor 1 and the fluid moves from left to right, the ultrasonic moving time $t_1$ depends on the following Mathematical Equation 2, and $$t_1 = \frac{d}{C + v\cos\theta} \quad \text{Mathematical Equation 2}$$

When the ultrasonic moving direction and the flow direction of fluid are opposite to each other, that is, when the fluid moves from left to right and the ultrasonic wave is transmitted from the ultrasonic sensor 2, the ultrasonic moving time $t_2$ depends on the following Mathematical Equation 3.

$$t_2 = \frac{d}{C - v\cos\theta} \quad \text{Mathematical Equation 3}$$

In the above Mathematical Equations 2 and 3, $t_1$ and $t_2$ represent the ultrasonic moving time, d represents a distance between the sensors, C represents the ultrasonic moving velocity m/s, v represents a fluid velocity of the ultrasonic path, and θ represents an installation angle of the ultrasonic sensors 1 and 2.

In the above Mathematical Equations 2 and 3, arranging the fluid velocity v after subtracting $1/t_2$ from $1/t_1$, which are reciprocal number of the ultrasonic moving time, becomes the following Mathematical Equation 4.

$$v = \frac{d}{2\cos\theta}\left(\frac{1}{t_1} - \frac{1}{t_2}\right) \quad \text{Mathematical Equation 4}$$

A flow rate Q flowing in the conduit may be basically calculated by a product of the average velocity of fluid by the vertical cross sectional area of the conduit filled with the fluid. In order to convert the fluid velocity v into an average velocity $\hat{v}$ of fluid flowing in a cross-section of the conduit, the fluid velocity v of the ultrasonic path needs to be divided by a compensating factor. In this case, the flow rate flowing in the conduit may be calculated by the following Mathematical Equation 5.

$$Q = \frac{v}{k}\frac{\pi \cdot D^2}{4} \quad \text{Mathematical Equation 5}$$

The reason of compensating for the fluid velocity v of the ultrasonic path by the compensating factor k in the above Mathematical Equation 5 is that as illustrated in FIG. 1, the flow velocities on the ultrasonic sensors 1 and 2 axes facing each other are the linear average flow velocity but a flow velocity distribution is present in the conduit, and therefore the flow velocity has a difference from the average velocity of fluid flowing in the cross-section of the conduit. Therefore, an error of flow measurement may be reduced only when the linear average fluid velocity v needs to be compensated by the average velocity of fluid flowing in the cross-section of the conduit.

However, in case of using the compensating factor k generally used to compensate for the linear average fluid velocity v, since it is assumed that the measured axis (corresponding to the ultrasonic path) passes through a center of the conduit as illustrated in FIG. 2(a) and the flow velocity distribution has an ideal distribution symmetrical to the measured axis, when the actual flow velocity distribution is biased (asymmetrical) as illustrated in FIGS. 2(b) or (c), the compensation error cannot also but be large. There is a method of increasing the number of axes (referred to as siding) measured to reduce the effect of the compensating error to two or four as illustrated in FIG. 3 to calculate an average fluid velocity. However, since the ultrasonic sensors are arranged so that the respective sidings are arranged in parallel as illustrated in the right of FIG. 3, a general ultrasonic flowmeter illustrated in FIG. 3 may not also measure the fluid velocity between the axes. Therefore, the ultrasonic flowmeter having the arrangement of the ultrasonic sensors as illustrated in FIG. 3 may not also completely compensate for an error due to drift currents. When the overall inside of the conduit is measured by indefinitely increasing the number of sidings, the measurement error may be reduced even though the drift current is present, which is physically impossible. For reference, in FIG. 2, a dashed line within the conduit represents a line connecting the places where the velocities of fluid are the same in the same cross-section.

Meanwhile, one of the error occurring factors in the ultrasonic flowmeter is a vibration of the conduit or a transmitting vibration of the peripheral ultrasonic sensors. That is, even when the vibration generated by peripheral factors affects the ultrasonic sensors 1 and 2 along a wall of the conduit made of metal, the error of the flow measurement occurs, and therefore a method for minimizing an error due to the vibration of the conduit is required.

DISCLOSURE

Technical Problem

In consideration of the above-described circumstances, it is an object of the present invention to provide an ultrasonic flow measurement system and a method thereof capable of more accurately measuring a flow rate by estimating drift currents in all directions within a conduit by crossing the plurality of sidings, which are ultrasonic paths, each other within the conduit.

In addition, another object of the present invention is to provide an ultrasonic flow measurement system capable of minimizing a flow measurement error by determining a flow center within a conduit and measuring a flow rate meeting the determined flow form.

Further, another object of the present invention is to provide an ultrasonic flow measurement system and a method thereof capable of more accurately measuring a flow rate by minimizing an effect of noise due to external vibrations.

Technical Solution

In order to achieve the above-described objects, according to an embodiment of the present invention, there is an ultrasonic flow measurement system, including:

a first ultrasonic sensor group including at least two pairs of ultrasonic sensors which are oppositely installed in a channel within a conduit so as to generate a plurality of sidings, a siding being made by receiving and transmitting signals of a pair of ultrasonic sensors;

a second ultrasonic sensor group including at least two pairs of ultrasonic sensors which are oppositely installed in the channel so as to generate a plurality of sidings three-dimensionally crossing the plurality of sidings generated by the ultrasonic sensors included in the first ultrasonic sensor group; and a flow operator configured to calculate a flow rate flowing in the conduit based on a plurality of linear average flow velocity data obtained by ultrasonic receiving/transmitting signals of each ultrasonic sensor included in the first and second ultrasonic sensor groups.

In addition, each ultrasonic sensor included in the first and second ultrasonic sensor groups may be arranged in parallel with ultrasonic sensors included in each group, and each of the ultrasonic sensor groups may include four pairs of ultrasonic sensors.

Further, the ultrasonic sensors included in each sensor group may be oppositely installed in the channel so that a crossing angle between the sidings generated from the first ultrasonic sensor group and the sidings generated from the second ultrasonic sensor groups has any one value ranging from 30° to 90°.

Each of the ultrasonic sensors may be inserted into sensor housing parts of sensor protective tubes to be inserted and fixed into sensor insertion holes formed by penetrating an outer wall of the conduit, and an outer wall of the sensor protective tube may be made of a Fe—Mn based damping alloy.

Advantageous Effects

As described above, according to the embodiments of the present invention, the ultrasonic flow measurement system may determine a flow central part of fluid by three-dimensionally crossing the plurality of sidings each other within the conduit to calculate a flow rate flowing in the conduit, thereby capable of more accurately measuring the flow rate than the existing method.

Further, according to the embodiments of the present invention, the outer wall of the sensor protective tube of the ultrasonic flow measurement system may be made of the Fe—Mn based damping alloy to block the vibration of the adjacent ultrasonic sensors or the vibration of the pipe from being propagated, thereby capable of relatively reducing the flow measurement error due to the peripheral factors.

DESCRIPTION OF DRAWINGS

FIG. 4 is a diagram three-dimensionally illustrating a plurality of ultrasonic sensors which are installed in a conduit according to an embodiment of the present invention.

FIG. 5 is a diagram for describing an angle and an arrangement state of a plurality of ultrasonic sensors 26 installed in a conduit 10 as illustrated in FIG. 4, and sidings generated by each ultrasonic sensor 26.

Best Mode

Hereinafter, a preferred embodiment of the present invention will be described in detail with reference to the accompanying drawings.

Figure 1:
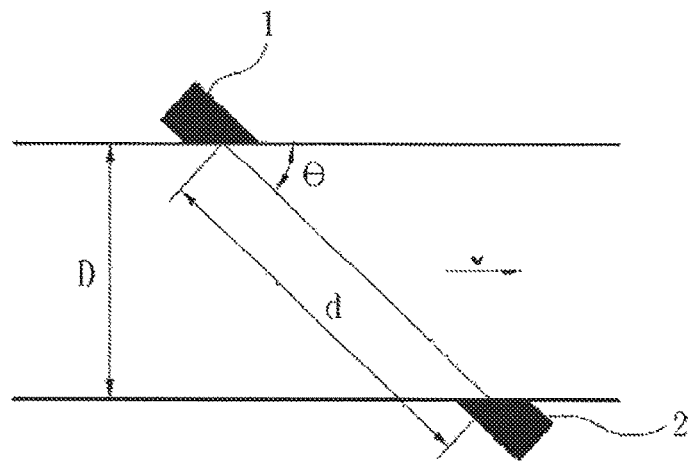
FIG. 1 is a diagram for describing a basic flow measurement principle of an ultrasonic flowmeter.
Figure 2:
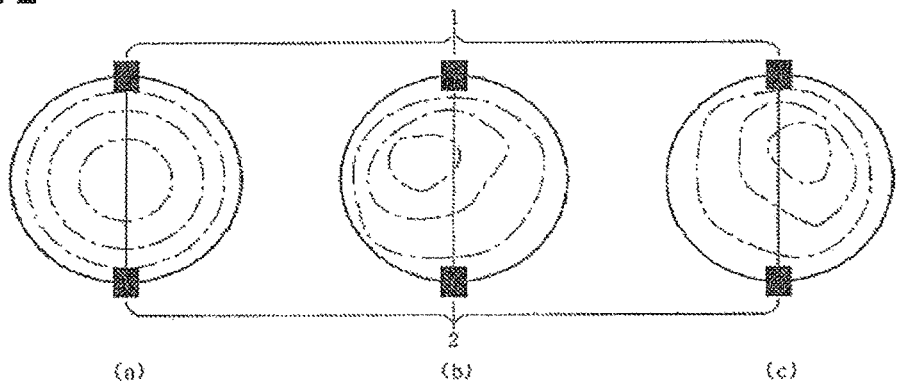
FIG. 2 is a diagram illustrating a flowing form of fluid within a conduit.
Figure 3:
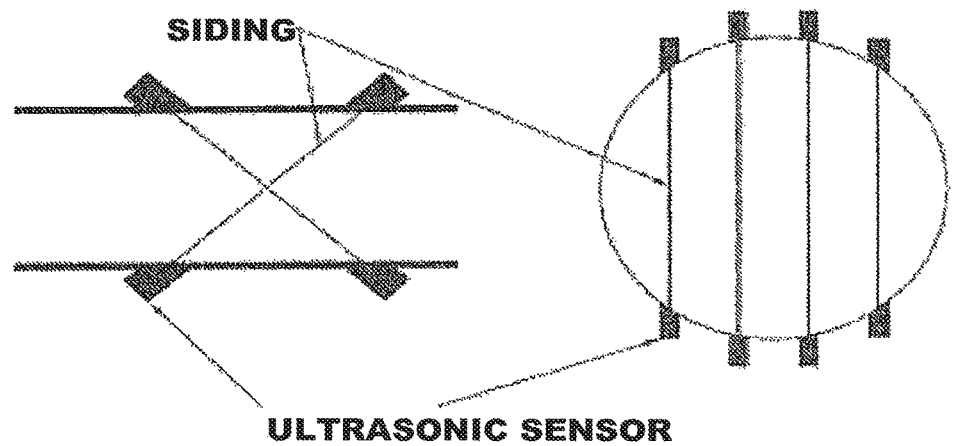
FIG. 3 is a diagram of the prior art illustrating the number of sidings corresponding to the number of ultrasonic paths within the conduit and illustrates that respective sidings do not cross each other.
Figure 6:
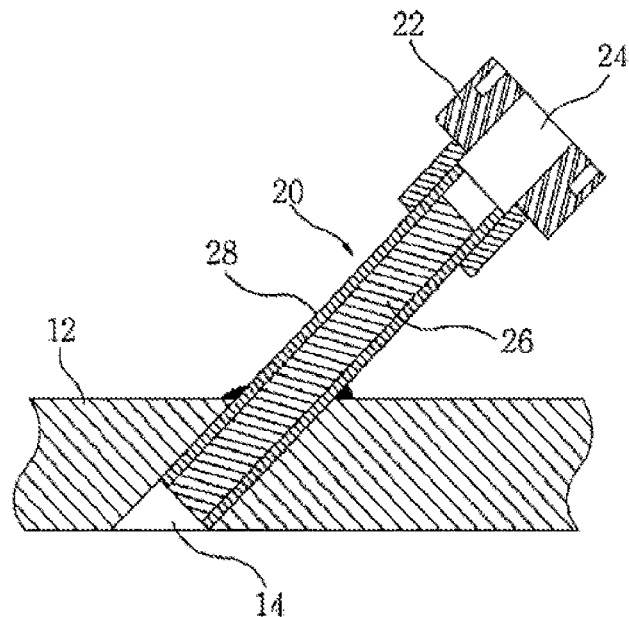
FIG. 6 is a diagram for describing a structure of an ultrasonic sensor protective tube and an incident angle according to the embodiment of the present invention.

FIG. 4 is a diagram three-dimensionally illustrating a plurality of ultrasonic sensors 26 which are installed in a conduit 10 according to an embodiment of the present invention, and FIG. 5 is a diagram for describing an angle and an arrangement state of the plurality of ultrasonic sensors 26 installed in the conduit 10 as illustrated in FIG. 4, and sidings having a lattice structure generated by each ultrasonic sensor 26. FIG. 6 is a diagram for describing a structure of an ultrasonic sensor protective tube and an incident angle according to the embodiment of the present invention.

First, as illustrated in FIG. 4, the ultrasonic flow measurement system according to the embodiment of the present invention includes a first ultrasonic sensor group 26a including at least two pairs, in the present embodiment, four pairs of ultrasonic sensors 26 which are arranged in parallel with each other, and are oppositely installed in a channel within the conduit 10 by penetrating an outer wall of the conduit 10. One siding is generated between a pair of ultrasonic sensors 26 facing each other by receiving/transmitting signals of the ultrasonic sensors 26. Therefore, four sidings penetrating through a fluid may be formed within the conduit 10 by a first ultrasonic sensor group 26a having the four pairs of ultrasonic sensors 26 facing each other. For reference, the siding has the same meaning as an ultrasonic path, and therefore for the convenience of explanation, hereinafter the ultrasonic path is referred to the siding.

In addition to the first ultrasonic sensor group 26a, the ultrasonic flow measurement system according to the embodiment of the present invention further includes a second ultrasonic sensor group 26b including another four pairs of ultrasonic sensors which are oppositely installed in the channel to generate a plurality of sidings three-dimensionally crossing the plurality of sidings generated by the ultrasonic sensors 26 included in the first ultrasonic sensor group 26a. Each ultrasonic sensor 26 included in the first and second ultrasonic sensor groups 26a and 26b may be arranged in parallel with adjacent ultrasonic sensors included in each group as illustrated in FIG. 5(b). Although the embodiment of the present invention describes that each ultrasonic sensor group 26a and 26b includes four pairs of ultrasonic sensors 26, this is only an example. Therefore, the number of ultrasonic sensors 26 may be increased and reduced in proportion to a diameter of the conduit 10.

The most important fact is that, in order to more accurately compensate for an error due to drift currents within the conduit 10, there is a need to dispose the ultrasonic sensors 26 so that the sidings generated by each of the first ultrasonic sensor group 26a and the second ultrasonic sensor group 26b three-dimensionally cross each other within the conduit 10. To this end, according to the embodiment of the present invention, as illustrated in FIG. 5(b), the ultrasonic sensors 26 included in each sensor group 26a and 26b are oppositely installed in the channel within the conduit 10 so that a crossing angle θ between a siding a generated by the first ultrasonic sensor group 26a and a siding b generated by the second ultrasonic sensor group 26b has any one value ranging from 30° to 90°. In this case, as illustrated in FIG. 5(a) or 6, each of the ultrasonic sensors 26 is inserted into sensor insertion holes 14 formed by penetrating an outer wall of the conduit 10, and has an incident angle of any one value ranging from 20° to 70°.

Further, each of the ultrasonic sensors 26 may be inserted into sensor housing parts 24 of sensor protective tubes 22 to be inserted and fixed into the sensor insertion holes 14 formed by penetrating the outer wall of the conduit 10, and an outer wall 28 of the sensor protective tube 22 is preferably made of a Fe—Mn based damping alloy to block a vibration of the adjacent ultrasonic sensors 26 or a vibration of the pipe from being propagated.

Meanwhile, the ultrasonic flow measurement system according to the embodiment of the present invention further include an a flow operator configured to calculate a flow rate flowing in the conduit 10 based on a plurality of linear average flow velocity data obtained by the ultrasonic receiving/transmitting signals of each ultrasonic sensor 26 included in the first and second ultrasonic sensor groups 26a and 26b. According to the embodiment of the present invention, the flow operator calculates a flow rate Q by multiplying a sum of eight linear average flow velocity data by an inner cross-sectional area of the conduit 10 and a weight Wi. Additionally, the flow operator may determine the flow form within the conduit 10 based on a position of a siding having the largest value among the plurality (eight) of linear average flow velocity data, and read the weight Wi meeting the determined flow form from an internal memory to calculate the flow rate.

The flow operator may be configured to further include a controller and a memory generally controlling an operation of the flowmeter, and a signal preprocessor for processing an amplification of the signals output from each sensor, a removal of noise, and a digital signal.

For reference, the flow operator may calculate the flow rate Q by multiplying the weight Wi by each linear average flow velocity data and then multiplying the inner cross-sectional area of the conduit 10 by a sum thereof as in the following Mathematical Equation 6. For reference, the weight Wi is determined by a numerical integration method known as a weighting factor relating to the siding changed depending on the installation position of the ultrasonic sensor 26, the weighted linear average flow velocity is obtained by a product of the weight Wi by the linear average flow velocity measured in each path, and the average velocity of fluid flowing in the cross-section of the conduit is obtained by a sum of the weighted linear average flow velocities. The flow rate Q may be more accurately calculated by multiplying the inner cross-sectional area of the conduit 10 by the obtained average velocity of fluid flowing in the cross-section of the conduit 10.

The weight Wi is values previously obtained by experiments and is values stored and used in the internal memory of the flow operator.

$$Q = \left(\frac{\pi D^2}{4}\right) \sum_{i=0}^{7} \left\{ W_i \cdot \left(\frac{1}{2} \frac{1}{\cos\theta_i} \frac{d_i \Delta t_i}{t_{1i} t_{2i}}\right) \right\} \quad \text{Mathematical Equation 6}$$

Factors used in the above Mathematical Equation 6 are the same as the factors cited in the above-described Mathematical Equations. That is, D represents the diameter of the conduit 10, d represents the distance between the sensors, and i represent eight sidings.

Figure 7:
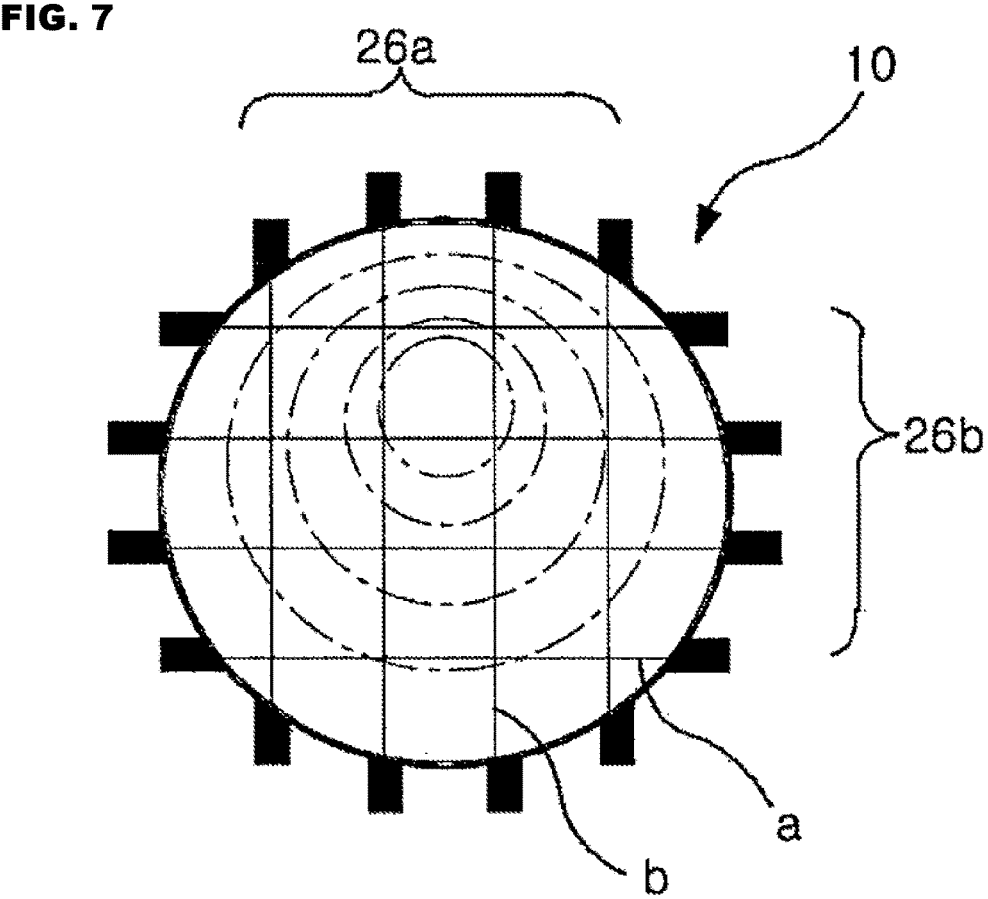
FIG. 7 is a diagram illustrating an arrangement of sidings formed within the conduit 10 and a flow center of fluid according to the embodiment of the present invention.

As described above, when each ultrasonic sensor 26 included in the first ultrasonic sensor group 26a and the second ultrasonic sensor group 26b according to the embodiment of the present invention are oppositely installed in channel within the conduit 10 as illustrated in FIGS. 4 and 7, four sidings a and b are generated in a horizontal direction and a vertical direction as illustrated in FIG. 7 by the ultrasonic signals received and transmitted between the ultrasonic sensors 26 forming each pair. Since the sidings a and b cross each other, even though the drift currents as illustrated in FIG. 7 are generated within the conduit 10, the flow center may be detected by some sidings a and b three-dimensionally crossing each other.

Therefore, even though the flow center of fluid disproportionately flows in any direction within the conduit 10, the value of the biased flow central part is detected to be reflected to the flow calculation. Therefore, the flow rate Q having a relatively smaller error value than the existing method may be accurately calculated.

Meanwhile, according to the embodiments of the present invention, the outer walls 28 of the sensor protective tubes of each of the ultrasonic sensors 26 of the ultrasonic flow measurement system may be made of the Fe—Mn based damping alloy to block the vibration of the adjacent ultrasonic sensors or the vibration of the pipe from being propagated, thereby capable of relatively reducing the flow measurement error due to the peripheral factors.

Figure 8:
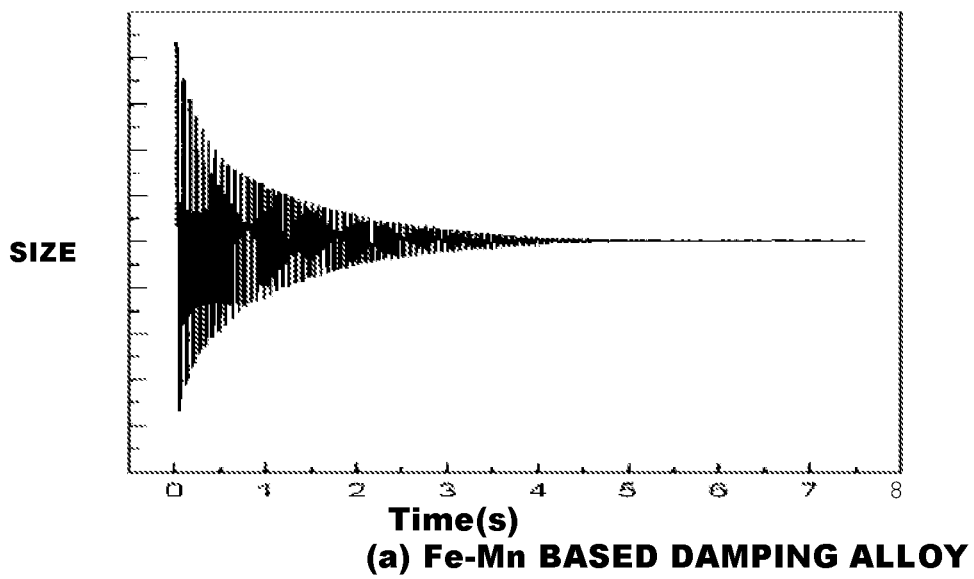
FIG. 8 is an exemplary comparison diagram illustrating vibration damping characteristics for each material.
Figure 8:
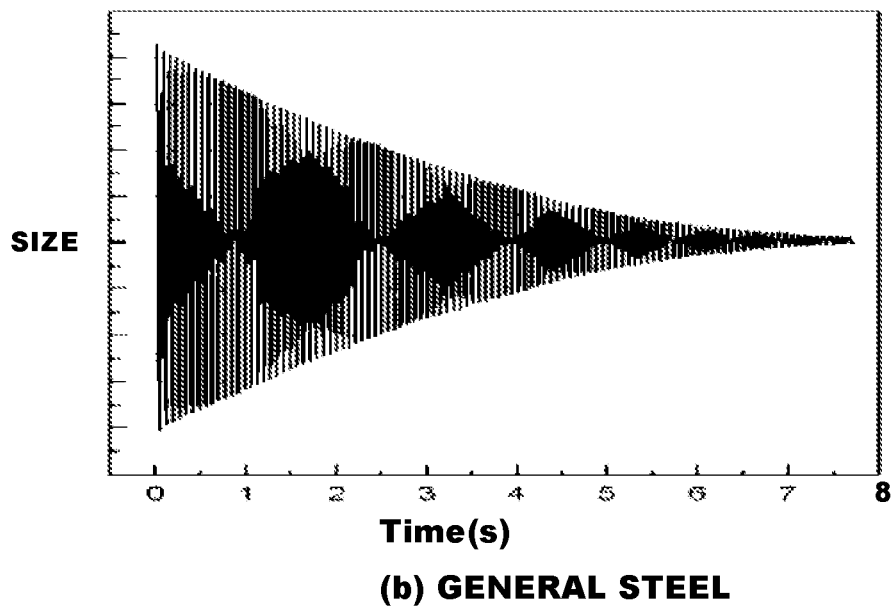

Additionally, the effect of the outer wall 28 of the sensor protective tube 22 made of the Fe—Mn based damping alloy will be described with reference to FIG. 8 which is a comparison diagram of the vibration damping characteristics. First, FIG. 8 illustrates characteristic curves in which a size of vibration is reduced over time when external vibrations having the same size are applied to the Fe—Mn based damping alloy a and a general steel b. As illustrated, the Fe—Mn based damping alloy shows characteristics suddenly absorbing external impact over time as compared with the general steel. Therefore, when the Fe—Mn based damping alloy is used as the material of the outer wall of the sensor protective tube 22, the external vibration is rapidly damped, and thus the ultrasonic wave is stably generated from the ultrasonic sensor 26, in more detail, a piezoelectric element, thereby reducing the flow measurement error.

As described above, although the present invention will be described with reference to the embodiments illustrated in drawings, this is only an example. Therefore, it will be appreciated by those skilled in the art that various modifications and equivalent other embodiments are possible from the present invention. Accordingly, the actual technical protection scope of the present invention must be determined by the spirit of the appended claims.

The invention claimed is:

1. A method for an ultrasonic flow measurement system, comprising:
   forming a first siding group by arranging at least two pairs of sidings generated by receiving and transmitting signals of a pair of ultrasonic sensors facing each other, so as to measure a flow velocity distribution in one direction perpendicular to a direction in which a fluid flows; and
   arranging a plurality of siding groups having the first siding group and a second siding group by crossing each other so that a crossing angle formed between a line obtained by projecting sidings of the first siding group to a surface perpendicular to the direction in which the fluid flows and a line obtained by projecting sidings of the second siding group to the direction in which the fluid flows is within a range from 30° to 90°, so as to measure the flow velocity distributions in a plurality of directions, and thus to measure three-dimensional flow velocity distributions.

2. The method of claim 1, wherein the crossing angle is 90°.

3. The method of claim 1, wherein an angle formed by each siding and the direction in which the fluid flows of a conduit is within a range of 20° to 70°.

4. The method of any one of claims 2, 3 and 1 further calculating a flow rate Q of a fluid flowing in the conduit from flow rate values calculated on each siding, and
   the flow rate Q is calculated by multiplying an inner cross-sectional area of the conduit and a weight Wi by a sum of linear average flow velocity data.

* * * * *